United States Patent
Dunn et al.

(10) Patent No.: US 6,865,815 B1
(45) Date of Patent: Mar. 15, 2005

(54) SAFETY UTENSILS FOR INFANTS AND SMALL CHILDREN

(75) Inventors: Steven B. Dunn, Beverly Hills, CA (US); Tor Petterson, Rancho Palos Verdes, CA (US)

(73) Assignee: Munchkin, Inc., Van Nuys, CA (US)

( * ) Notice: Subject to any disclaimer, the term of this patent is extended or adjusted under 35 U.S.C. 154(b) by 750 days.

(21) Appl. No.: 08/730,625

(22) Filed: Oct. 21, 1996

(51) Int. Cl.$^7$ .............................................. A47J 43/28
(52) U.S. Cl. ......................... 30/324; 116/216; 374/162
(58) Field of Search ........................... 30/324, 325, 326, 30/327, 328; 150/52; 521/114; 206/232; 106/21, 31.16, 31.41; D7/653, 664, 401.2; 374/162; 116/216

(56) References Cited

U.S. PATENT DOCUMENTS

| | | | |
|---|---|---|---|
| 782,433 A | | 2/1905 | Ashley |
| 856,768 A | | 6/1907 | Comins |
| 1,312,111 A | * | 8/1919 | Frankland ..................... 30/324 |
| 1,961,547 A | | 6/1934 | Busch ............................ 30/22 |
| 2,255,052 A | * | 9/1941 | Green .......................... 30/324 |

(List continued on next page.)

FOREIGN PATENT DOCUMENTS

| | | | |
|---|---|---|---|
| GB | 2 307 298 | * | 5/1997 |
| JP | 406125831 | * | 5/1994 ................... 30/324 |

OTHER PUBLICATIONS

"2–Pack Starter Spoons" by Geoffrey, Inc., Item # 26191, 1996.*
B&H Liquid Crystal Brochure "Baby Safety Feeding Spoon."
Packaging of Oops!Proof (TM) Color Changing Spoons, Copyright Notice provides date of "1994."

(List continued on next page.)

Primary Examiner—Hwei-Siu Payer
(74) Attorney, Agent, or Firm—Knoble Yoshida & Dunleavy, LLC

(57) ABSTRACT

An improved utensil for feeding a small child includes a coating of a relatively soft plastic material provided over a rigid base portion that has a relatively high capacity for heat conduction and storage. The relatively soft plastic material is formulated to change color when exposed to a substance, such as food, that is above a predetermined temperature. During use, the presence of the base portion acts as a heat storage reservoir in order to lengthen and delocalize the color change response of the soft plastic material, thereby making the color change response more continuous and more noticeable to the caregiver. Also disclosed is a kit of different utensils that start out as different colors, but that change to a uniform warning color when overheated. The concept of the uniform warning color makes it easier for children and caregivers alike to identify the warning when it occurs.

18 Claims, 2 Drawing Sheets

U.S. PATENT DOCUMENTS

| | | | | | |
|---|---|---|---|---|---|
| 2,873,027 | A | * | 2/1959 | Dohner | 30/324 |
| 3,254,409 | A | * | 6/1966 | Gardel et al. | 30/324 |
| 3,259,132 | A | * | 7/1966 | Katter | 30/324 |
| 3,277,714 | A | | 10/1966 | Crandell et al. | 73/343 |
| D207,018 | S | | 2/1967 | Di Benedetto | D44/29 |
| D207,270 | S | | 3/1967 | Di Benedetto | D44/29 |
| 3,405,678 | A | | 10/1968 | Frenkel et al. | 116/114 |
| 3,510,643 | A | | 5/1970 | File | 240/6.46 |
| 3,695,110 | A | | 10/1972 | Biolik | 73/343 |
| 3,839,793 | A | | 10/1974 | Crapio | 30/123 |
| 3,845,662 | A | | 11/1974 | Surgina et al. | 73/358 |
| 3,864,976 | A | | 2/1975 | Parker | 73/356 |
| D235,405 | S | | 6/1975 | Brown et al. | D7/50 |
| 3,915,213 | A | * | 10/1975 | Graham, Jr. | 150/52 |
| 4,045,383 | A | * | 8/1977 | Koff | 349/199 |
| 4,070,912 | A | * | 1/1978 | McNaughtan et al. | 374/162 |
| 4,106,197 | A | * | 8/1978 | Russell | 30/324 |
| 4,156,365 | A | | 5/1979 | Heinmets et al. | 73/343 |
| 4,207,673 | A | | 6/1980 | DiGirolamo et al. | 30/142 |
| 4,296,631 | A | | 10/1981 | Fergason | 73/356 |
| 4,421,560 | A | * | 12/1983 | Kito et al. | 106/21 |
| 4,425,161 | A | | 1/1984 | Shibahashi et al. | 106/21 |
| 4,445,787 | A | | 5/1984 | Parker | 374/141 |
| 4,580,909 | A | | 4/1986 | McIntosh | 374/141 |
| 4,642,250 | A | | 2/1987 | Spector | 428/1 |
| 4,666,949 | A | * | 5/1987 | Shimizu et al. | 521/114 |
| 4,717,710 | A | * | 1/1988 | Shimizu et al. | 503/213 |
| 4,725,462 | A | | 2/1988 | Kimura | 428/29 |
| 4,818,215 | A | | 4/1989 | Taga | 431/126 |
| 4,821,417 | A | | 4/1989 | Levine | 30/298 |
| 4,826,550 | A | | 5/1989 | Shimizu et al. | 156/166 |
| 4,830,222 | A | * | 5/1989 | Read | 222/106 |
| 4,907,903 | A | | 3/1990 | Kawashima | 401/151 |
| 4,917,643 | A | | 4/1990 | Hippely et al. | 446/14 |
| 4,919,983 | A | | 4/1990 | Fremin | 428/35.7 |
| 5,011,017 | A | * | 4/1991 | Giesen | 206/494 |
| 5,014,434 | A | | 5/1991 | Skerker et al. | 30/345 |
| 5,029,701 | A | * | 7/1991 | Roth et al. | 206/232 |
| 5,044,914 | A | | 9/1991 | Schülling | 425/169 |
| 5,085,607 | A | | 2/1992 | Shibahashi et al. | 446/14 |
| 5,189,793 | A | | 3/1993 | Ratzon et al. | 30/123 |
| 5,215,491 | A | | 6/1993 | Willet et al. | 446/176 |
| 5,316,513 | A | | 5/1994 | Nakagawa et al. | 446/14 |
| 5,326,174 | A | * | 7/1994 | Parker | 374/134 |
| 5,376,325 | A | | 12/1994 | Ormson | 264/254 |
| 5,400,610 | A | | 3/1995 | Macedo | 62/130 |
| 5,508,498 | A | | 4/1996 | Rheinish et al. | 219/730 |
| 5,527,385 | A | | 6/1996 | Sumii et al. | 106/21 |
| 5,534,013 | A | | 7/1996 | Zeindler | 606/234 |
| 5,890,223 | A | * | 4/1999 | Klemmer | 30/150 |

OTHER PUBLICATIONS

Packaging of "Too Hot" (TM) Color Changing Safety Spoons.

(Website) Ontario Ministry of Health and Long–Term Care—Health Advisory—Food Safety, "If there is an electrical power blackout," (Subheadings: Preparting ready–to–feed formula, How to prepare formula from a powder preparation) pp. 1–2.

(Website) National Network for Child Care (NNCC)— "Keeping Food Safe" for Baby by Dawn L. Hentges, Foods and Nutrition Specialist, Cooperative Extension Service, University of Illinois, (Subheadings: Infant Formula, *Microwave Heating*, Expressed Breast Milk, Baby Food, *Microwave Heating*, Safe Storage of Baby Food, Liquids, Special Handling and Solids), pp. 1–5.

(Website) Feeding Baby Safely: Facts, Fads and Fallacies, A Report by The American Council on Science and Health by Julie A. Albrecht, Ph.D., Dean O. Cliver, Ph.D., Ruth Kava, Ph.D., R.D., George R. Kerr, M.D., Cindy F. Kleiman, M.P.H., Kathryn Kolasa, Ph.D., R.D., LD/N., Manfred Kroger, Ph.D., William M. London, Ed.D., M.P.H., Mary Frances Picciano, Ph.D., Fredric J. Stare, M.D., Ph.D., Elizabeth M. Whelan, D.Sc., M.P.H. and Edhard E. Ziegler, M.D., pp. 1–6.

Begin a lifetime of healthy eating: The Everything Baby's First Food Book, Tasty, nutritious meals and snacks that even the picki child will love–from birth to age 3, by Janet Mason Tarlov, p. 82.

What to Expect the First Year, by Arlene Eisenberg, Heidi E. Murkoff and Sandee E. Hathaway, B.S.N., "Feeding Baby Safely", pp. 230–231.

(Website) United States Department of Agriculture—General Food Safety Information, "Feeding Babies and Young Children: A Teen Sitter's Guide to Food Safety," by Mary Ann Parmley, (Subheadings: Keeping a Baby, *Baby's Bottle, Baby Food*, Leftovers, Snacks for Older Kids and Kitchen "Musts"), pp. 1–3.

(Website) Dr. Spock: How to Makr Your Own Baby Food, by Mary Silva, M.S., R.D., (Subheadings: Preparation, step by step, Storing your baby food, *Heating tips* and Foods to use (fresh or frozen), pp. 1–2.

(Website) Dr. Spock: Formula Preparation and Feeding, Parent Advice Handouts by Barton Schmitt, MD, (Subheadings: Mixing Concentrate, Mixing Powdered Formula, Preparing One Bottle at a Time, Preparing a Batch of Formula, *Formula Temperature*, How Much Formula to Give and When to Give the Bottle), pp. 1–2.

(Website) Chicago Tribune: Homemade Baby Food Made Easy by Martha Stewart, New York Times Syndicate, pp. 1–2.

Super Baby Food,—Part I. Feeding Your Super Baby—*The Food's Temperature*, by Ruth Yaron, p. 24.

(Website) Burns Safety Sep. 97—Safety for Life: Protecting our Children (Sep. 1998), (Subheadings: Hot Liquids Burn Li Fire, Hot Tap Water and Scald Burns, Scalds in the Kitchen, Scalds and Microwave Ovens and Halloween Safety Tips), pp. 1.

* cited by examiner

SAFETY UTENSILS FOR INFANTS AND SMALL CHILDREN

BACKGROUND OF THE INVENTION

1. Field of the Invention

This invention relates broadly to the field of child care and feeding, and more specifically to an improved construction for utensils and other implements that may be used to feed infants and small children.

2. Description of the Related Technology

Most infants are bottle or breast fed a diet of breast milk or formula for the first three months after birth, and are introduced to solid food at about the fourth month. From the fourth until about the twelfth month, the child is spoon fed by the caregiver. From the twelfth month until about the eighteenth month, the child learns to feed herself with some assistance from a caregiver. After about the eighteenth month, most children are sufficiently advanced to feed themselves without assistance.

A panoply of different utensils for feeding children are available to parents. Some are made entirely of metal. Some are made entirely of plastic. Others, known informally in the industry as "soft bite utensils," are metal that is coated with a soft plastic material on the end that is intended to be received in the infant's mouth. Utensils are available in a wide array of styles, and many are embellished with toy-like projections, cartoon figures, and the like for the child's entertainment.

An infant's senses are very keen, and her mouth and gums are very sensitive to contact with hard objects such as a spoon and, especially, to temperature variations. Gums are also very sensitive during teething. This is exacerbated by the fact that during the initial self-feeding period, the child will lack motor skills in opening and closing her mouth, using her tongue, and the hand and motor skills that are necessary to eat without occasionally poking her gums and other parts of her mouth with the utensil.

Experienced caregivers will attempt to test the temperature of food before giving it to the infant, but an adult who tests the food on a wrist or by sampling the food is not nearly as sensitive to temperature variations as the infant will be. Moreover, some caregivers will from time to time forget to test for temperature. A child that has progressed to self-feeding will eventually learn to be cautious when sampling heated food, but in the interim may have several painful or unpleasant experiences. Temperature is important for other reasons, as well. Pediatricians recommend that formula and the first baby food be served at a temperature that is as close as possible to 98.6 degrees Fahrenheit in order to minimize the possibility of "nipple confusion," which is when the infant becomes confused and begins to refuse the mother's breast.

One company is presently manufacturing infant feeding spoons that are fabricated from a hard plastic material that is designed to change color when coming into contact with a hot substance. Although useful in determining when food is too hot, the hard plastic material is rough on the gums of an infant. In addition, the limited heat storage capacity of the plastic material means that the color change will, in some instances, occur too fleetingly or in too localized an area to be an effective warning to the caregiver or to the child. Another potential drawback with the thermochromic utensils made by this manufacturer is that they come in a number of different colors, and each color changes to a different color when heated. If the entire utensil is heated, it is impossible for a caregiver or child to know that a color change has taken place unless he or she noted the original color of the utensil before it was used. This could be a particular source of confusion to the child who is learning to self feed.

A need exists for an improved utensil for infants and small children that is protective of the child's sensitive mouth, and that is designed to effectively convey to a child or caregiver, without the possibility of confusion, when food on the utensil is too hot to be comfortably consumed.

SUMMARY OF THE INVENTION

Accordingly, it is an object of the invention to provide an improved utensil for infants and small children that is protective of the child's sensitive mouth, and that is designed to effectively convey to a child or caregiver, without the possibility of confusion, when food on the utensil is too hot to be comfortably consumed.

In order to achieve the above and other objects of the invention, an improved utensil for feeding a small child includes, according to a first aspect of the invention, a handle; and a feeding end attached to the handle, the feeding end including a rigid base portion that is made from a first material that has a relatively high capacity for storing and conducting heat, and a coating of a relatively soft plastic material provided over the rigid base portion, the relatively soft plastic material being formulated to change color when exposed to a substance, such as food, that is above a predetermined temperature, whereby the presence of the base portion acts as a heat storage reservoir in order to lengthen and delocalize the color change response of the soft plastic material during use, thereby making the color change response more continuous and more noticeable to the caregiver.

According to a second aspect of the invention, a kit for feeding infants and small children includes a plurality of utensils, each of which has a handle and a feeding end attached to the handle, the feeding ends of the utensils being, under unheated conditions, of different initial colors, and wherein the materials on the feeding ends of said utensils are, irrespective of the initial colors of the feeding ends, formulated to change color when exposed to a substance, such as food, that is above a predetermined temperature, to turn to a uniform warning color that is recognizable by a user as such regardless of which utensil is in use at a given time.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
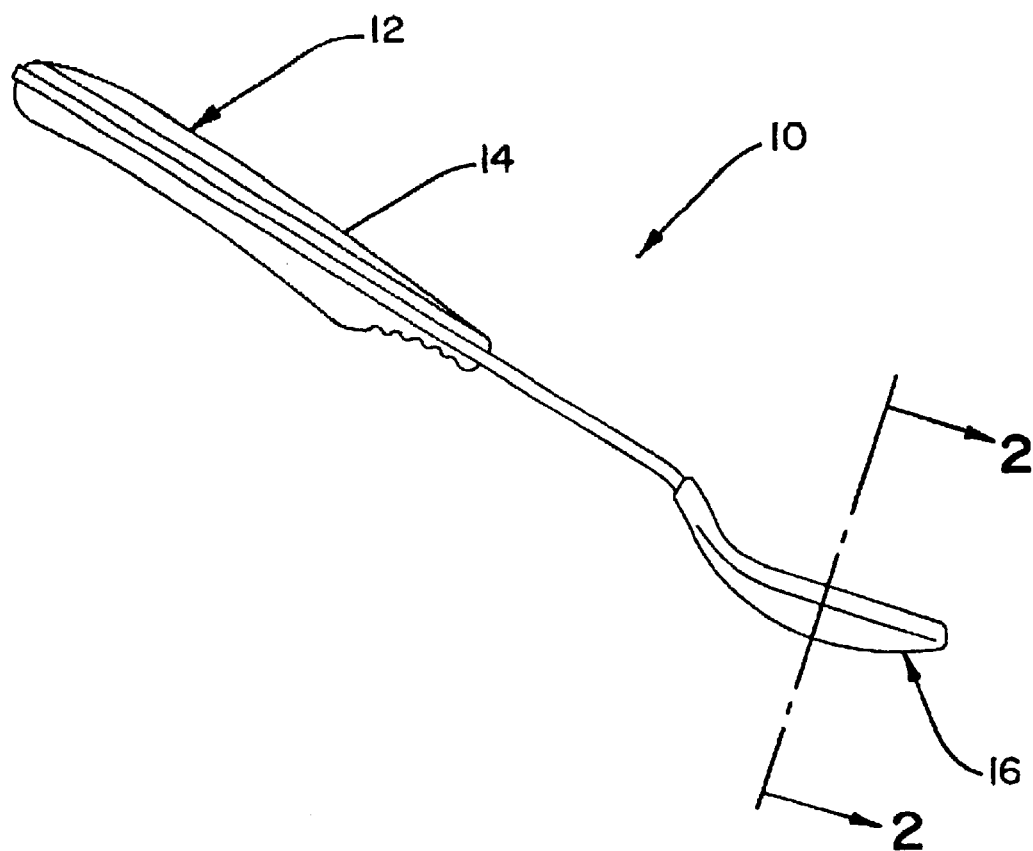
FIG. 1 is a perspective view of an improved utensil for feeding a young child that is constructed according to a preferred embodiment of the invention.
Figure 2:
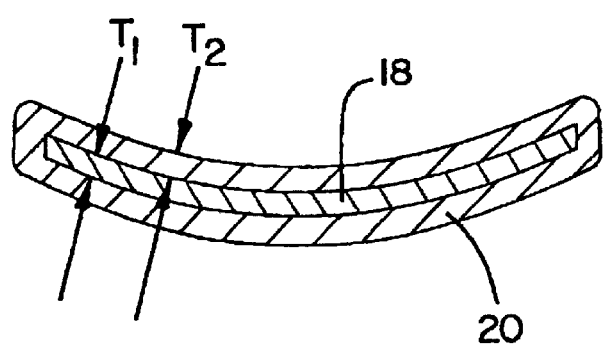
FIG. 2 is a cross sectional view taken along lines 2—2 in FIG. 1.

Referring now to the drawings, wherein like reference numerals designate corresponding structure throughout the views, and referring in particular to FIGS. 1 and 2, an improved utensil 10 for feeding a small child includes a handle 12, which in the preferred embodiment includes a molded gripping portion 14 and a feeding end 16 that is attached to the handle 12. In the embodiment shown in FIGS. 1 and 2, the utensil 10 is embodied as a spoon, and the feeding end 16 is so constructed. However, it should be understood that the utensil 10 could otherwise be constructed as fork, a knife or any other utensil that may be desired, and that the specific configuration shown in FIGS. 1 and 2 is exemplary only, and should not be construed as limiting.

As may best be seen in FIG. 2, feeding end 16 of utensil 10 includes a rigid base portion 18 that is made from a first material that has a relatively high capacity for storing and conducting heat, and a coating 20 of a relatively soft plastic material that is provided over the rigid base portion 18. The rigid base portion 18 is preferably metallic, and is most preferably made from a material such as stainless steel. Coating 20 is made of a soft plastic material, such as polyvinyl chloride, that is formulated to change color when exposed to a substance, such as food, that is above a predetermined temperature. Any now-water absorbing equivalent material having the desired properties, such as silicone, could alternatively be used. The coating 20 maybe so formulated by mixing a thermochromic additive to the polyvinyl chloride base material in an amount that is sufficient to achieve the desired color changing range. As an example, the inventors have achieved good success with a mixture of approximately 10% to 15% of Matsui type 37 thermochromic additive to the polyvinyl chloride base material, which resulted in a coating 20 that visibly changes color at a temperature of approximately 105.8 degrees Fahrenheit. The inventors believe that 105.8 degrees Fahrenheit is an appropriate temperature to be indicating to a care-giver or to a child that food is to hot to be comfortably consumed.

Preferably, the coating 20 has a hardness that is within the range of Shore 55A to Shore 50D. More preferably, the soft plastic material that forms the coating 20 has a hardness that is approximately Shore 80A. The rigid base portion 18 has an approximate thickness of $T_1$ of 0.06 inches. The coating 20 has approximate thickness $T_2$ that is preferably within the range of 0.005 inches to about 0.10 inches, and is preferably about 0.03 inches.

The molded gripping portion 14 may be tinted so that it matches the color of the feeding end 18 of the utensil under normal, unheated conditions, so that the caregiver will have a ready basis for color comparison as the feeding end is dipped into warm liquid or food. According to a second embodiment of the invention, the mold gripping portion 14 may also be tinted with a thermochromic additive so that is can be used by the caregiver to test the temperature of food or liquid without involving the feeding end 18. This is particularly advantageous when testing the temperature of warm milk or formula that is within a thin-necked baby bottle, since the feeding end 18 might not be able to fit through the neck of the bottle.

Figure 3A:
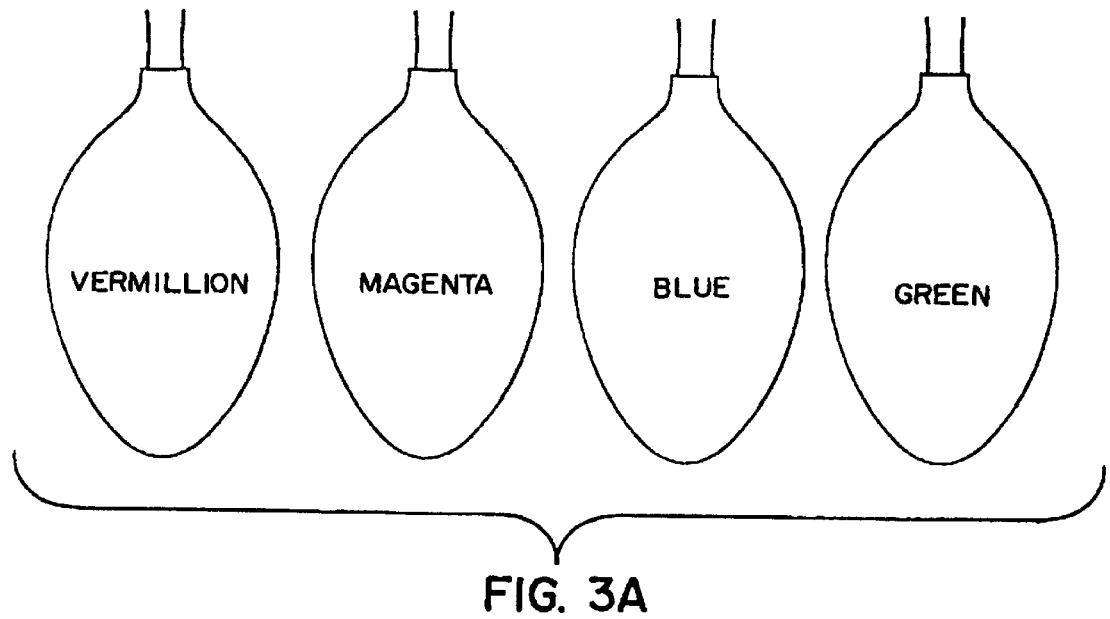
FIGS. 3A and 3B are a diagrammatical depiction of a kit that is constructed according to a preferred embodiment of the invention, shown in first and second conditions.
Figure 3B:
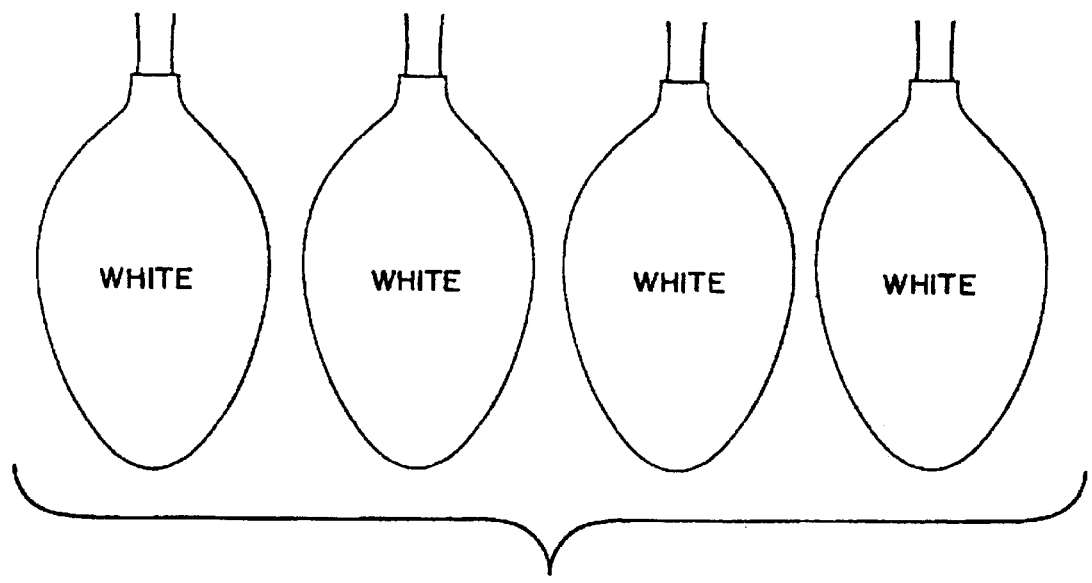

One of the important aspects of the invention is depicted diagrammatically in FIGS. 3A and 3B. According to this feature of the invention, a kit for feeding infants and small children may include a plurality of utensils, each of which has a handle and a feeding end as described above. The feeding ends of the utensils may be, under unheated, normal conditions, of different initial colors. For example, viewing FIG. 3A, a kit of four spoons includes feeding ends that are colored, variously, as vermilion, magenta, blue, and green. In order to avoid confusion on the part of the caregiver or the child, the kit is constructed so that, irrespective of the initial color of the feeding end of the utensil, the feeding ends are formulated to change color when heated to the predetermined temperature to a uniform warning color that is recognizable by a user as such regardless of which utensil is in use at a given time. As is illustrated in FIG. 3B, each of the different spoons in the kit turn to the uniform warning color, which is, in the illustrated embodiment, white, when heated above the predetermined temperature.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A kit for feeding infants and small children, comprising: a plurality of utensils, each of said utensils having a handle and a feeding end attached to said handle, said feeding ends of said utensils being, under unheated conditions, of different initial colors, and wherein a material on said feeding ends of said utensils is, irrespective of the initial colors of the feeding ends, formulated to change color when exposed to a substance, such as food, that is above a predetermined temperature that is appropriate for the comfortable consumption of food for a small child, to turn to a uniform warning color that is recognizable by a user as such regardless of which utensil is in use at a given time.

2. A kit according to claim 1, wherein said uniform warning color is white.

3. A kit according to claim 1, wherein there are at least three of said utensils.

4. A kit according to claim 1, wherein there are four of said utensils, and said feeding ends are colored, respectively, vermilion, magenta, blue and green, and wherein said uniform warning color is white.

5. A kit according to claim 1, wherein said feeding ends comprise means for retaining thermal energy during use, thereby lengthening and delocalizing the color change response.

6. A kit according to claim 5, wherein said retaining means comprises a rigid base portion that is made from a first material that has a relatively high capacity for storing and conducting heat.

7. A kit according to claim 6, wherein said first material is metallic.

8. A kit according to claim 7, wherein said first material comprises stainless steel.

9. A kit according to claim 6, wherein said base portion is coated with a soft plastic material that is formulated to change color at the predetermined temperature.

10. A kit according to claim 9 wherein said soft plastic material has a hardness that is within the range of Shore 55A to Shore 50D.

11. A kit according to claim 10, wherein said soft plastic material has a hardness that is approximately Shore 80A.

12. A kit according to claim 9, wherein said soft plastic material comprises polyvinyl chloride and a thermochromic additive.

13. A kit according to claim 9, wherein said soft plastic material is coated on said rigid base portion to be approximately 0.005 inches to 0.10 inches.

14. A kit according to claim 13, wherein said soft plastic material is coated on said rigid base portion to be approximately 0.03 inches.

15. A kit according to claim 1, wherein each of said utensils has an area on said handle that is color coded to match the color of said material for comparison purposes.

16. A kit according to claim 15, wherein said area is also thermochromic, whereby a caregiver can test the temperature of food without dipping the feeding end of the utensil into the food.

17. An improved article for use in feeding a person, comprising:
- a body; and
- a food contacting surface on said body, said food contacting surface being of a first initial color, said food contacting surface being constructed and arranged to lose its color and turn white when exposed to a substance, such as food, that is above a predetermined temperature that is appropriate for the comfortable consumption of food for a small child, the white colorless state thereby acting as a uniform warning state that is recognizable by a user as such regardless of the initial color of the article.

18. A kit for feeding infants and small children, comprising:
- a plurality of articles, each of said articles having a body and a food contacting surface on said body, said respective food contacting surfaces being of different colors; and wherein said food contacting surfaces are constructed and arranged to lose color and turn white when exposed to a substance, such as food, that is above a predetermined temperature that is appropriate for the comfortable consumption of food for a small child, the white colorless state thereby acting as a uniform warning state that is recognizable by a user as such regardless of the initial color of the article.

* * * * *